United States Patent
Kim et al.

(10) Patent No.: US 11,252,696 B2
(45) Date of Patent: Feb. 15, 2022

(54) METHOD AND DEVICE FOR PERFORMING SIDELINK COMMUNICATION IN WIRELESS COMMUNICATION SYSTEM

(71) Applicant: LG ELECTRONICS INC., Seoul (KR)

(72) Inventors: Myoungseob Kim, Seoul (KR); Hanbyul Seo, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/646,968

(22) PCT Filed: Sep. 12, 2018

(86) PCT No.: PCT/KR2018/010705
§ 371 (c)(1),
(2) Date: Mar. 12, 2020

(87) PCT Pub. No.: WO2019/054757
PCT Pub. Date: Mar. 21, 2019

(65) Prior Publication Data
US 2020/0213976 A1    Jul. 2, 2020

Related U.S. Application Data

(60) Provisional application No. 62/557,729, filed on Sep. 12, 2017.

(51) Int. Cl.
*H04W 4/00*    (2018.01)
*H04W 72/02*    (2009.01)
(Continued)

(52) U.S. Cl.
CPC .......... *H04W 72/02* (2013.01); *H04B 1/7143* (2013.01); *H04W 4/70* (2018.02);
(Continued)

(58) Field of Classification Search
None
See application file for complete search history.

(56) References Cited

U.S. PATENT DOCUMENTS

2015/0271807 A1* 9/2015 Patil ..................... H04W 52/383
455/426.1
2016/0338062 A1    11/2016 Rico-Alvarino et al.

FOREIGN PATENT DOCUMENTS

EP          3190844         7/2017
WO       2017078783         5/2017

OTHER PUBLICATIONS

Intel Corporation, "Sidelink Resource Allocation and Configuration for Wearable and IoT USe Cases," 3GPP TSG-RAN WG1 Meeting#90, R1-1712518, Aug. 2017, 7 pages.
(Continued)

*Primary Examiner* — Zewdu A Beyen
(74) *Attorney, Agent, or Firm* — Lee Hong Degerman Kang & Waimey

(57) ABSTRACT

Disclosed are a method and a device for performing sidelink communication in a wireless communication system. Specifically, the method performed by a terminal may comprise the steps of: receiving information on a resource pool related to narrowband sidelink communication from a base station, wherein the information includes information on at least one of a resource pool index and/or an initial allocation timing of the resource pool; and performing the narrowband sidelink communication through at least one resource pool determined on the basis of the information and a specific hopping pattern on a frequency domain, wherein the specific hopping pattern is determined on the basis of a hopping
(Continued)

pattern set for another narrowband-based communication of the terminal.

11 Claims, 13 Drawing Sheets

(51) Int. Cl.
    *H04W 4/70*     (2018.01)
    *H04W 4/80*     (2018.01)
    *H04B 1/7143*     (2011.01)
    *H04W 72/04*     (2009.01)
    *H04W 92/18*     (2009.01)

(52) U.S. Cl.
    CPC ........... *H04W 4/80* (2018.02); *H04W 72/042* (2013.01); *H04W 72/0446* (2013.01); *H04W 92/18* (2013.01)

(56) References Cited

OTHER PUBLICATIONS

ZTE, "Resource pool configuration for FeD2D," 3GPP TSG-RAN WG1 Meeting #90, R1-1712919, Aug. 2017, 6 pages.
PCT International Application No. PCT/KR2018/010705, International Search Report dated Jan. 7, 2019, 3 pages.

* cited by examiner

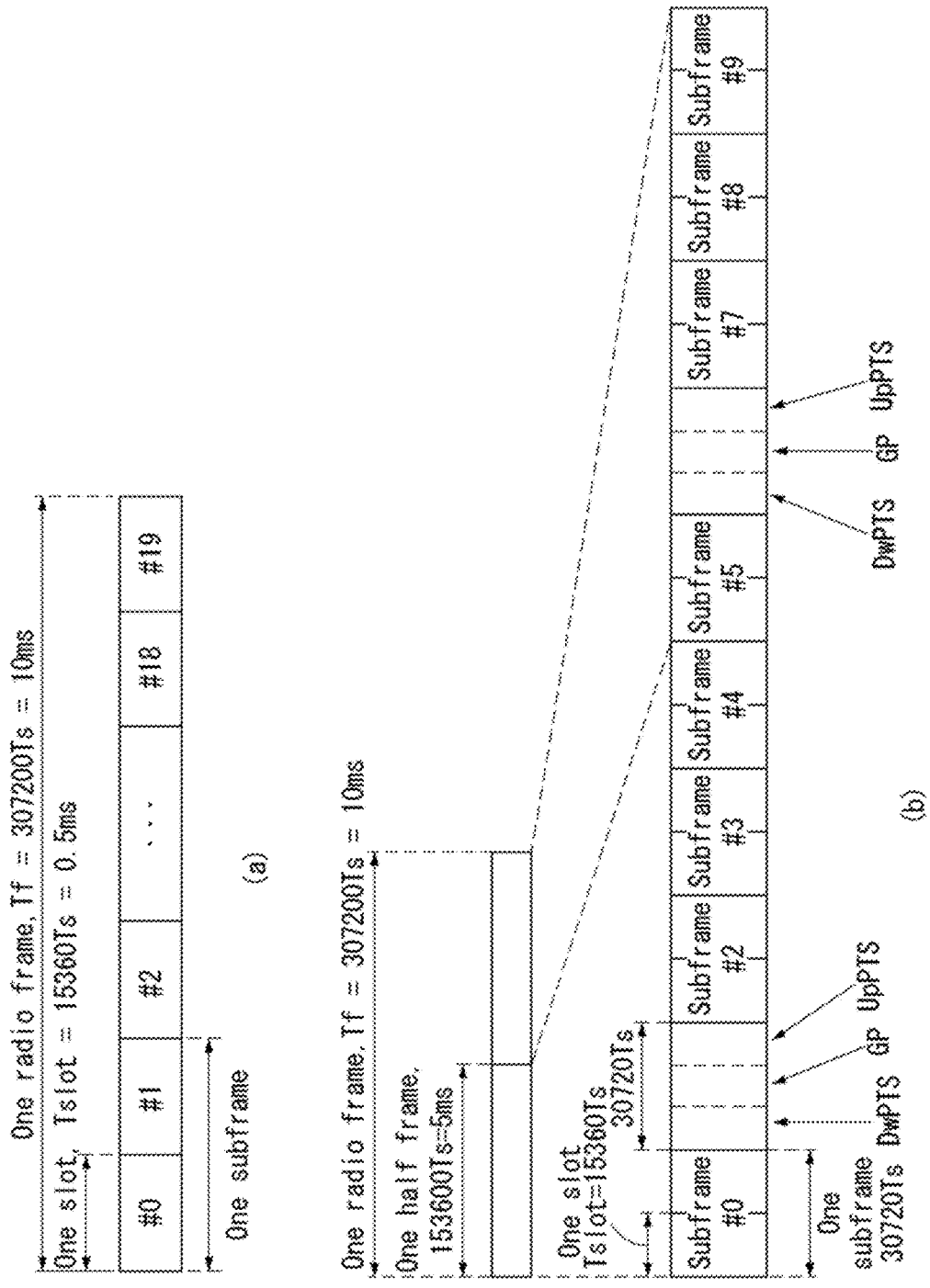

[Fig. 2]
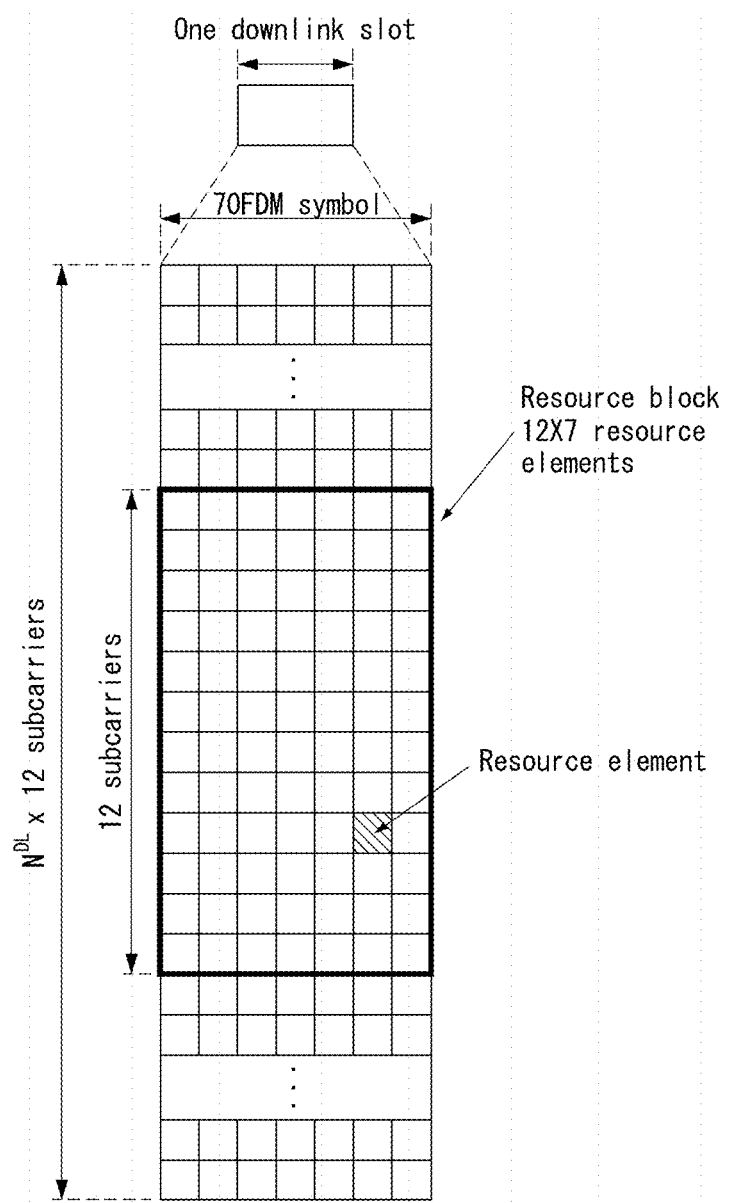

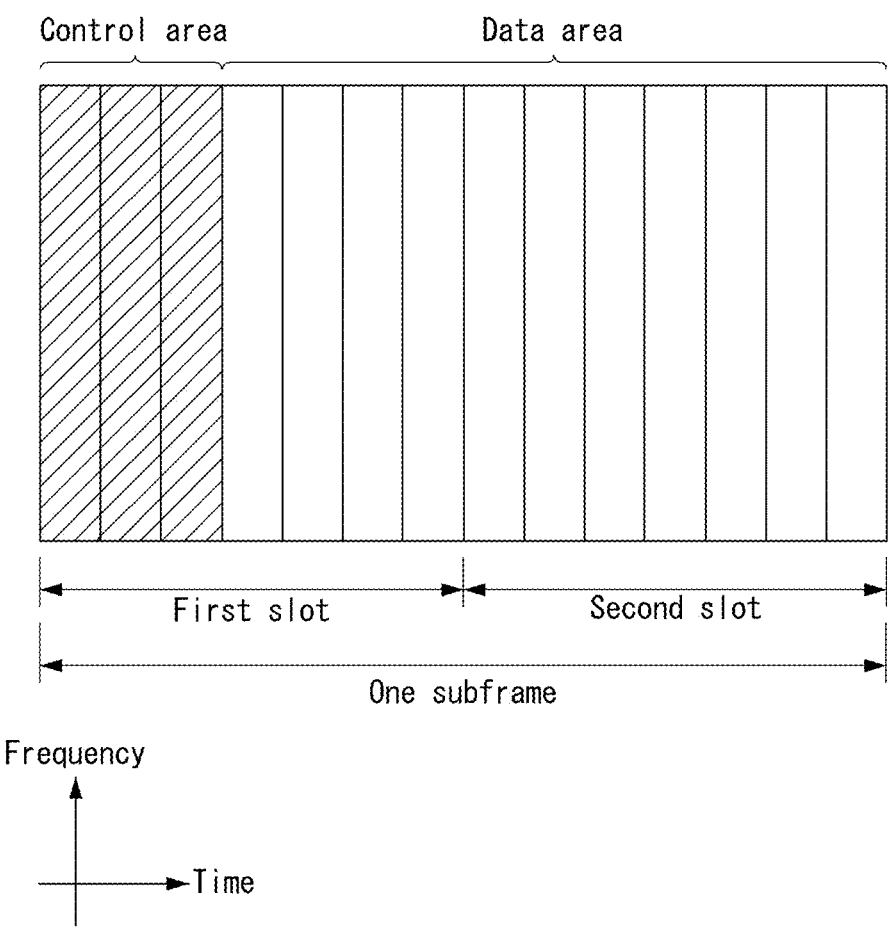

[Fig. 4]
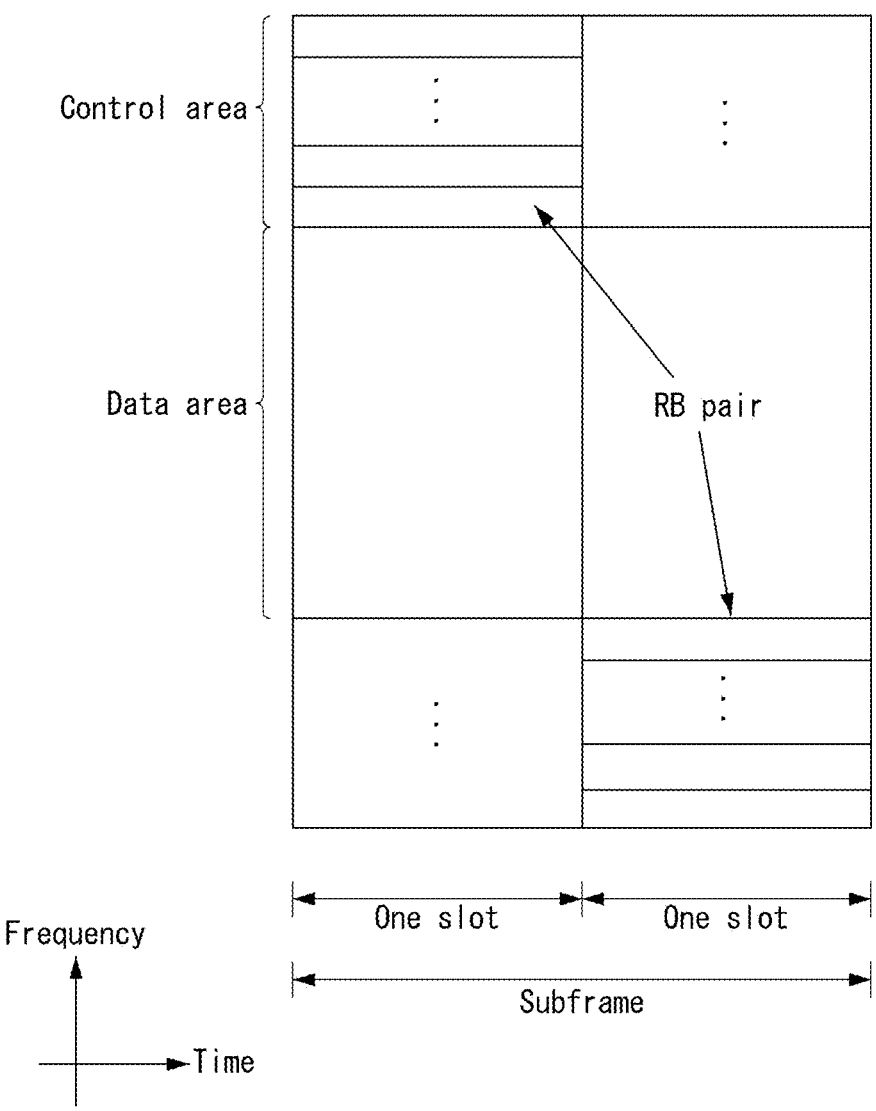

[Fig. 5]
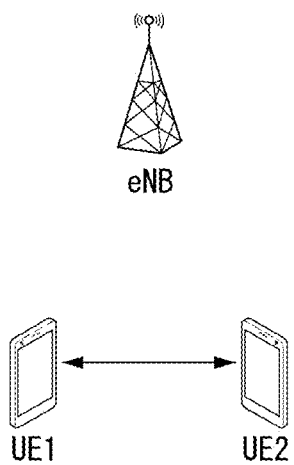
[Fig. 6]
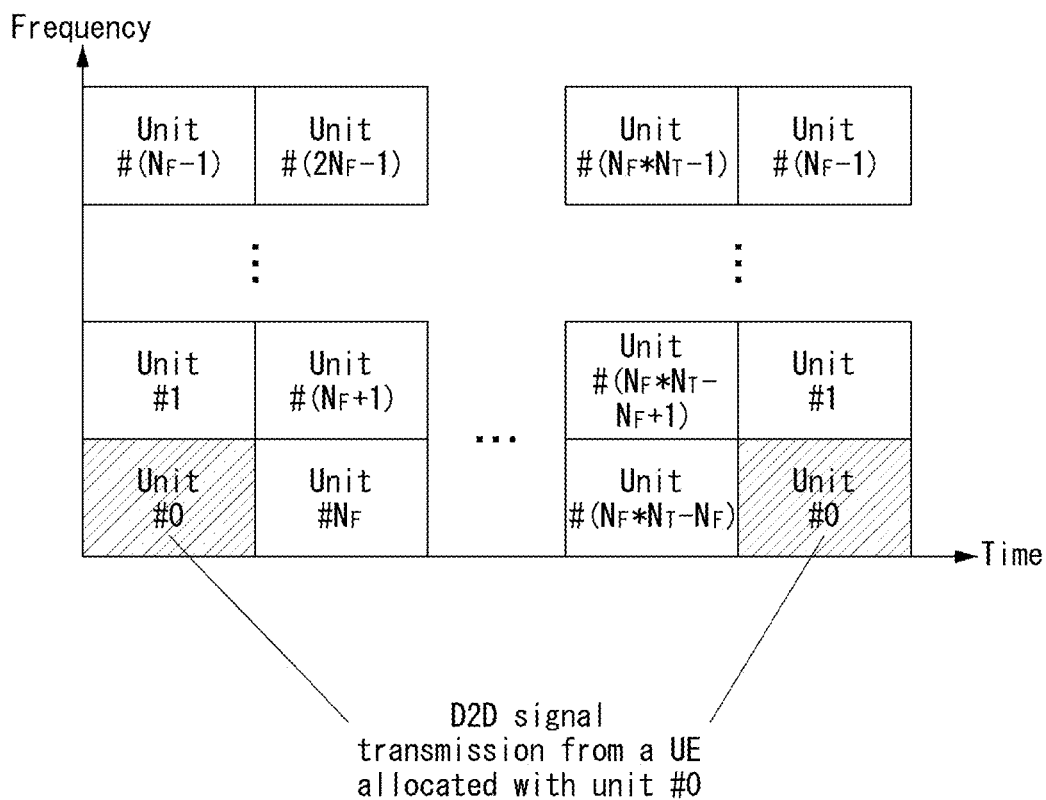

[Fig. 7]
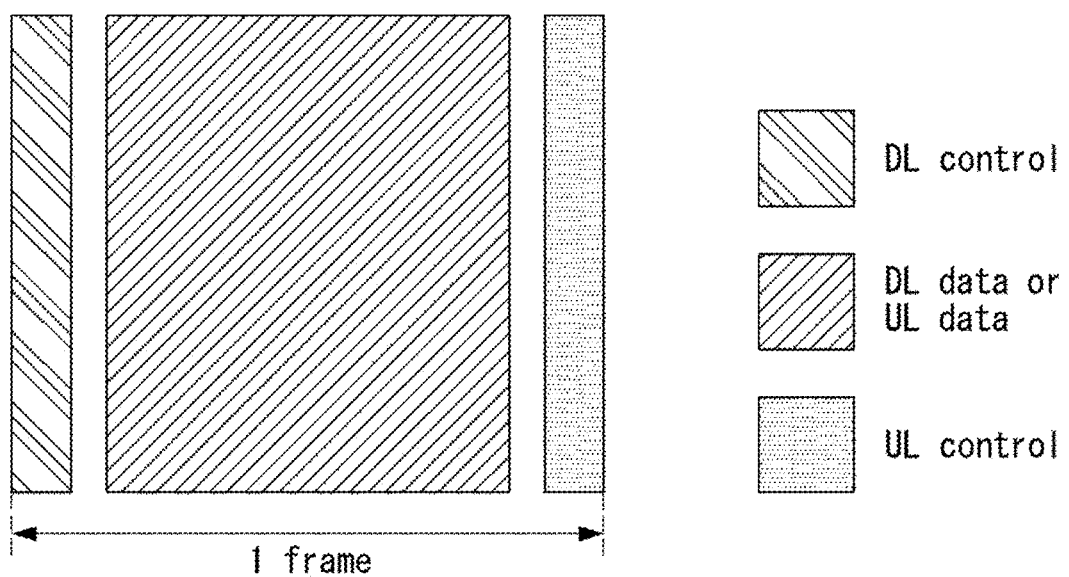

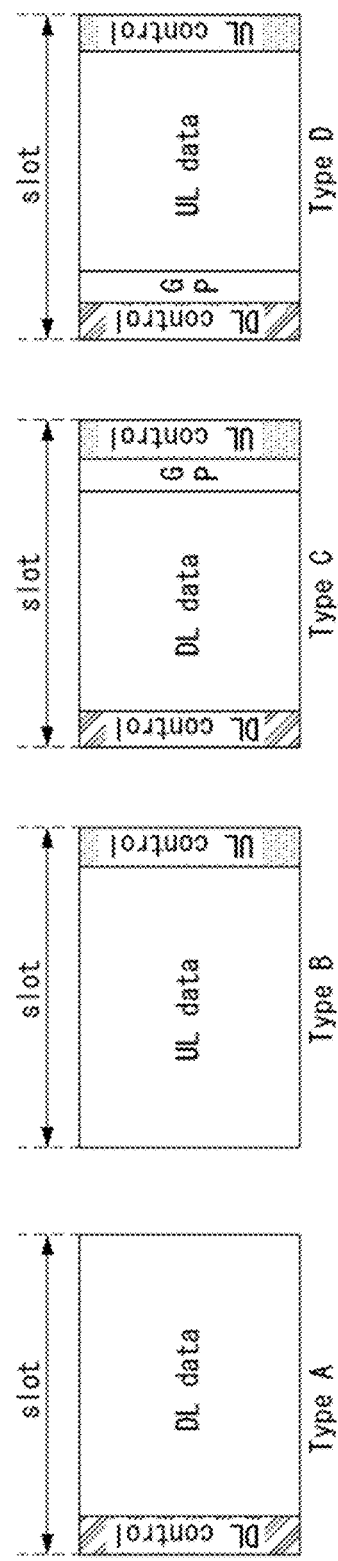
[Fig. 8]

[Fig. 9]

| RB index | System bandwidth | | |
|---|---|---|---|
| | 1.4 | 3 | 5 |
| 0 | 0 | 0 | 0 |
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | | 1 | 1 |
| 7 | | 1 | 1 |
| 8 | | 1 | 1 |
| 9 | | 1 | 1 |
| 10 | | 1 | 1 |
| 11 | | 1 | 1 |
| 12 | | | 2 |
| 13 | | | 2 |
| 14 | | | 2 |
| 15 | | | 2 |
| 16 | | | 2 |
| 17 | | | 2 |
| 18 | | | |
| 19 | | | 3 |
| 20 | | | 3 |
| 21 | | | 3 |
| 22 | | | 3 |
| 23 | | | 3 |
| 24 | | | 3 |

(a)

| RB index | System bandwidth | | |
|---|---|---|---|
| | 10 | 15 | 20 |
| 0 | | | 0 |
| 1 | | | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| 7 | 0 | 0 | 0 |
| 8 | | | |
| 9 | 1 | 1 | 1 |
| 10 | 1 | 1 | 1 |
| 11 | 1 | 1 | 1 |
| 12 | 1 | 1 | 1 |
| 13 | 1 | 1 | 1 |
| 14 | | | 1 |
| 15 | 2 | 2 | 2 |
| 16 | 2 | 2 | 2 |
| 17 | 2 | 2 | 2 |
| 18 | 2 | 2 | 2 |
| 19 | 2 | 2 | 2 |
| 20 | | | 2 |
| 21 | 3 | 3 | 3 |
| 22 | 3 | 3 | 3 |
| 23 | 3 | 3 | 3 |
| 24 | 3 | 3 | 3 |
| 25 | 3 | 3 | 3 |
| 26 | | | 3 |
| 27 | 4 | 4 | 4 |
| 28 | 4 | 4 | 4 |
| 29 | 4 | 4 | 4 |
| 30 | 4 | 4 | 4 |
| 31 | 4 | 4 | 4 |
| 32 | | | 4 |
| 33 | 5 | 5 | 5 |
| 34 | 5 | 5 | 5 |
| 35 | 5 | 5 | 5 |
| 36 | 5 | 5 | 5 |
| 37 | | | |
| 38 | 6 | 6 | 6 |
| 39 | 6 | 6 | 6 |
| 40 | 6 | 6 | 6 |
| 41 | 6 | 6 | 6 |
| 42 | | | |
| 43 | 7 | 7 | 7 |
| 44 | 7 | 7 | 7 |
| 45 | 7 | 7 | 7 |
| 46 | 7 | 7 | 7 |
| 47 | 7 | 7 | 7 |
| 48 | | | |
| 49 | | | |

⋮

(b)

[Fig. 10]
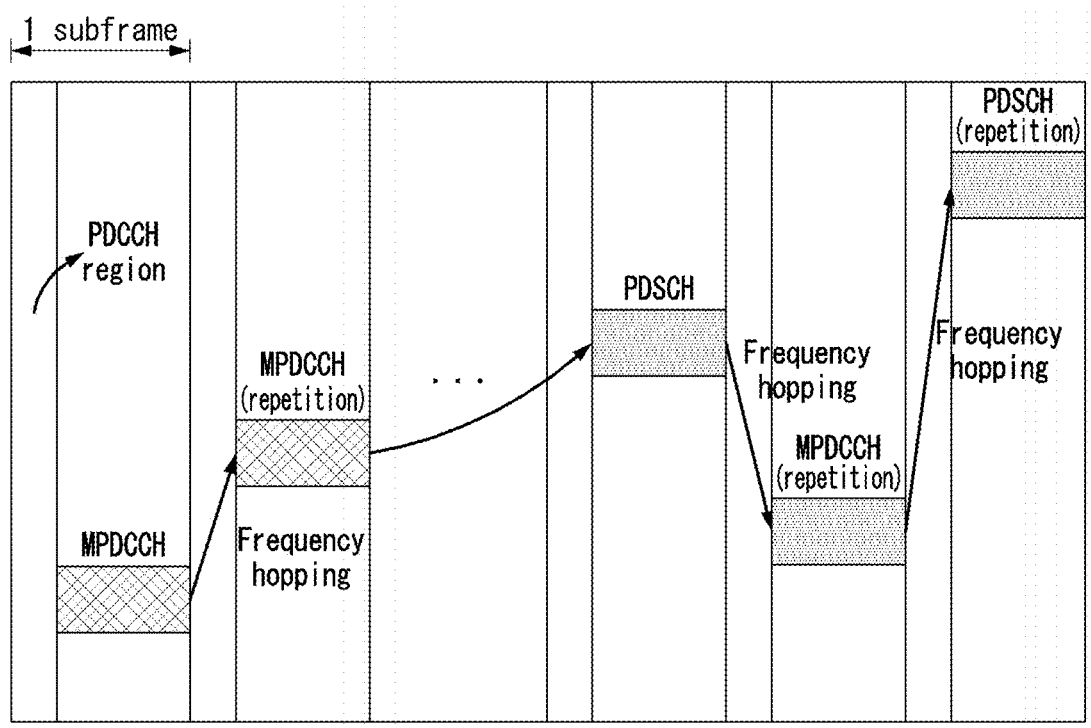

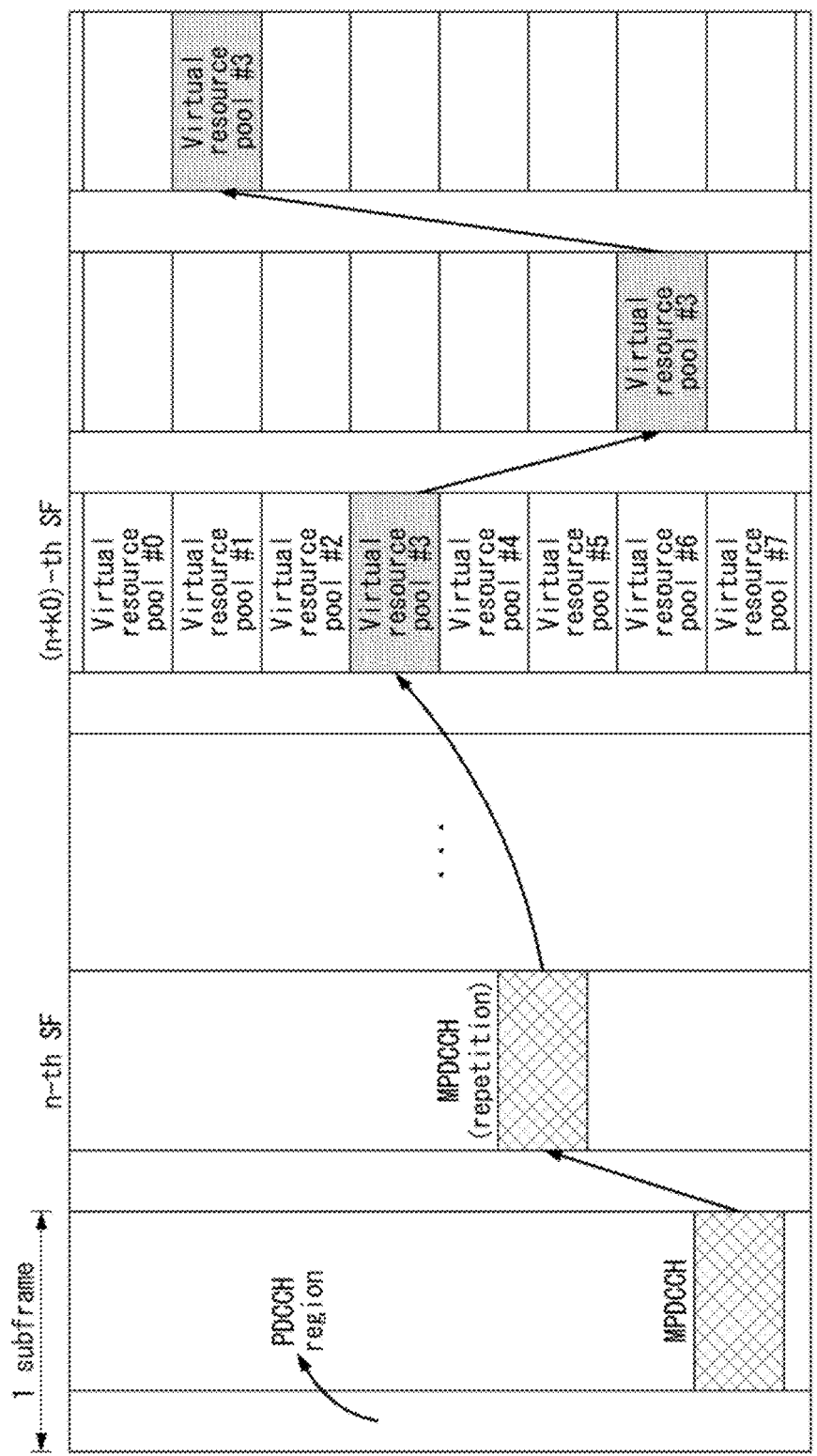
[Fig. 11]

[Fig. 12]
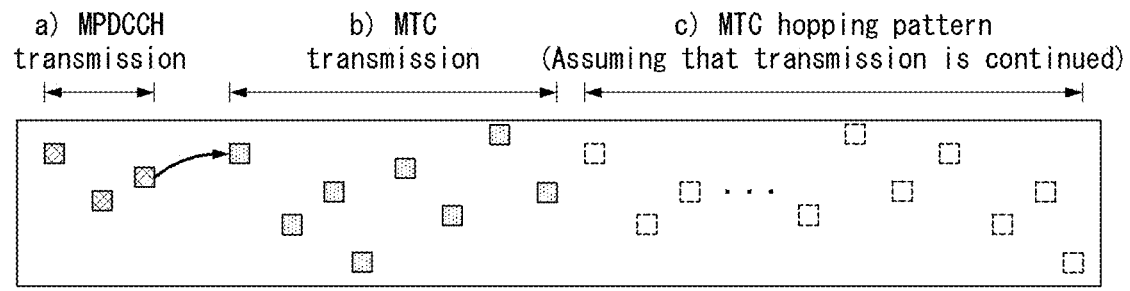
[Fig. 13]
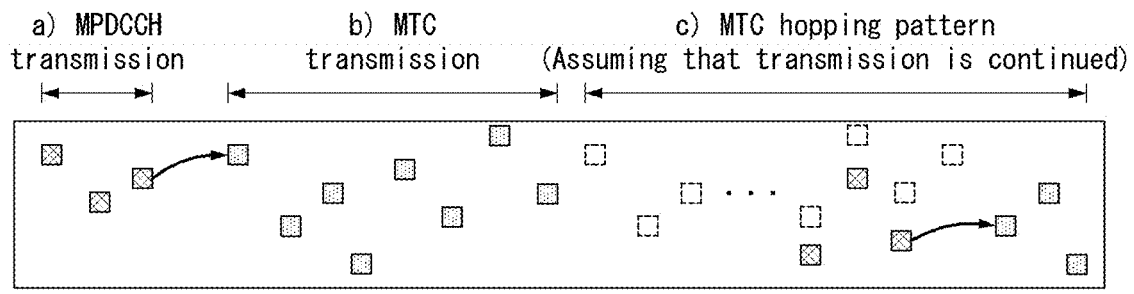
[Fig. 14]
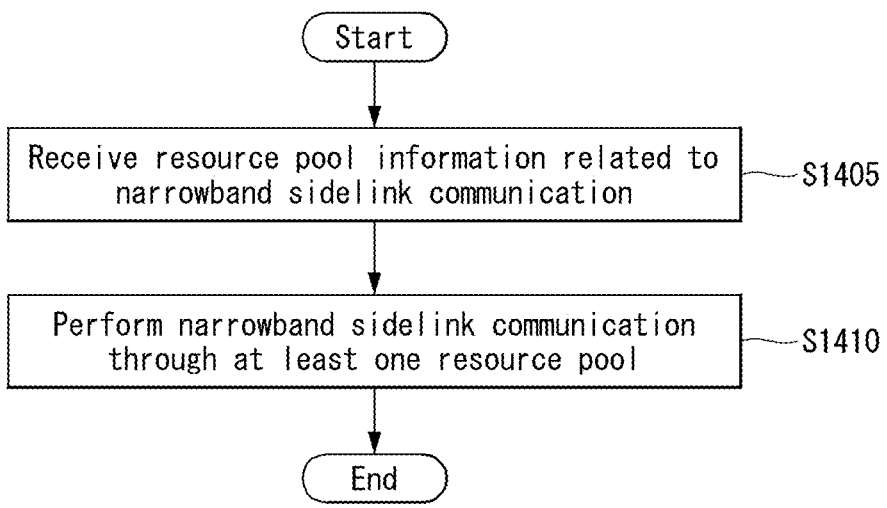

[Fig. 15]
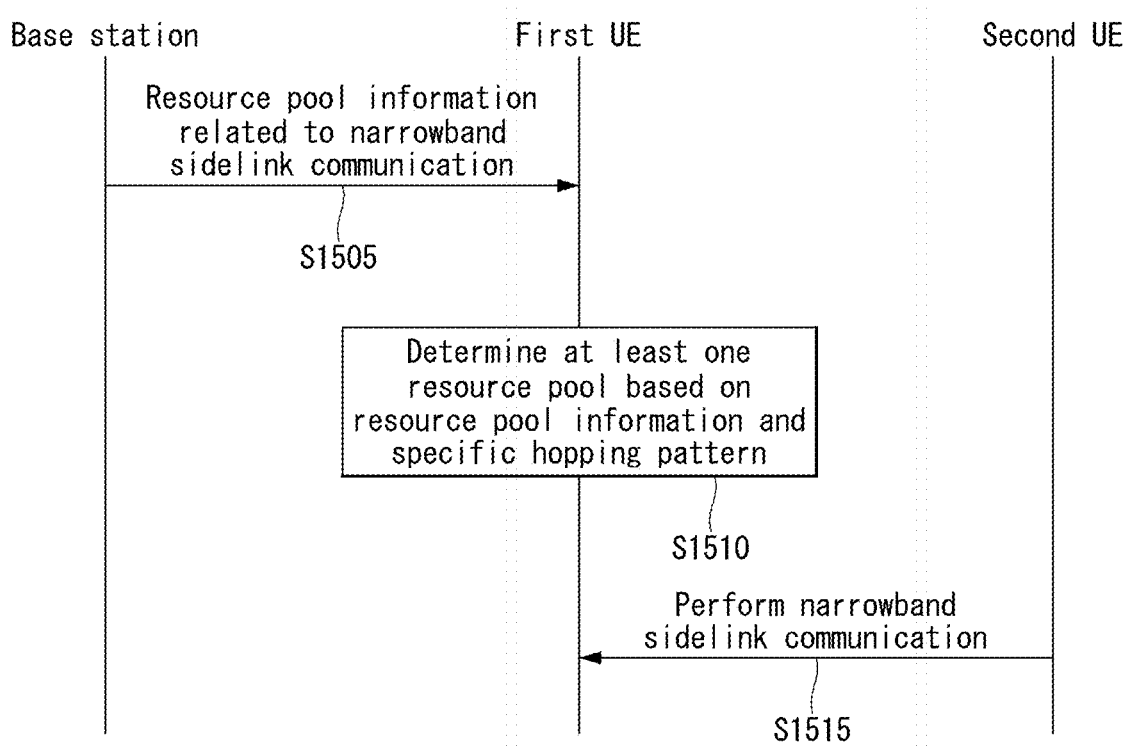
[Fig. 16]
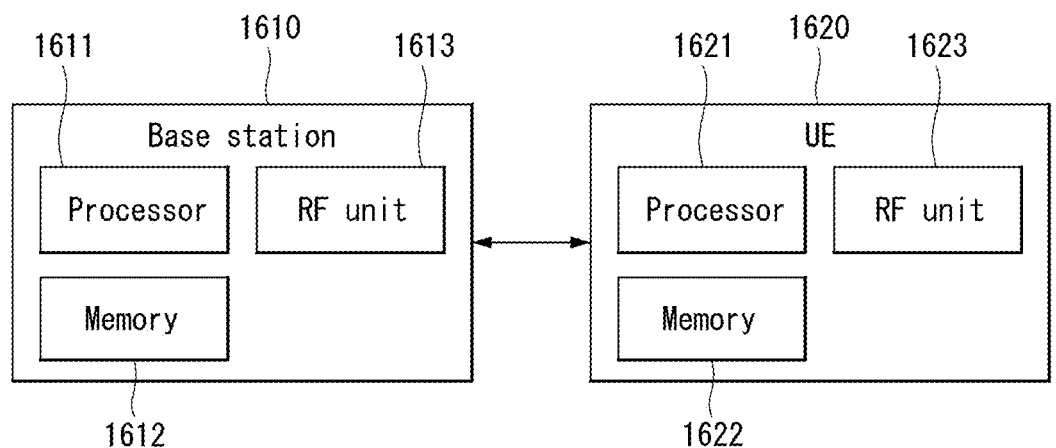

[Fig. 17]
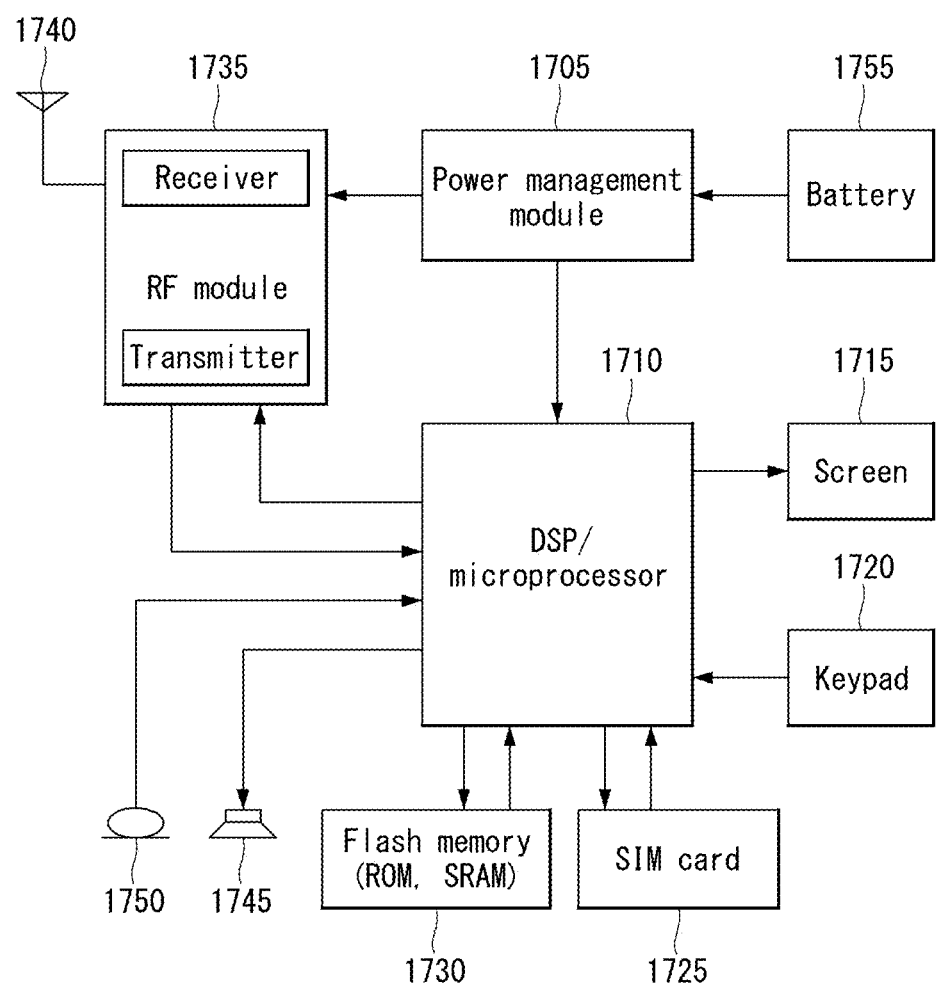

METHOD AND DEVICE FOR PERFORMING SIDELINK COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2018/010705, filed on Sep. 12, 2018, which claims the benefit of U.S. Provisional Application No. 62/557,729 filed on Sep. 12, 2017, the contents of which are all hereby incorporated by reference herein in their entirety.

TECHNICAL FIELD

The present disclosure relates to a wireless communication system and, more particularly, to a method of configuring a resource pool for narrowband sidelink communication in performing sidelink communication and an apparatus supporting the same.

BACKGROUND ART

Mobile communication systems have been developed to provide voice services while guaranteeing user activities. The mobile communication system has expanded its services to data service in addition to voice. Today the shortage of resources is caused due to an explosive increase of traffic. There is a need for a more advanced mobile communication system because users want higher-speed services.

Requirements for a next-generation mobile communication system basically include the handling of explosive data traffic, a significant increase in the per-user transmission rate, the accommodation of a significantly increased number of connected devices, very low end-to-end latency, and the support of high energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure proposes a method of performing, by a UE, sidelink communication in a wireless communication system and an apparatus therefor.

Specifically, the present disclosure proposes a method of configuring and indicating a resource pool for performing narrowband sidelink communication and an apparatus therefor.

Technical objects to be achieved in the disclosure are not limited to the aforementioned technical objects, and other technical objects not described above may be evidently understood by a person having ordinary skill in the art to which the disclosure pertains from the following description.

Technical Solution

In a method of performing sidelink communication in a wireless communication system according to an embodiment of the disclosure, the method is performed by a UE and includes receiving, from a base station, information for a resource pool related to narrowband sidelink communication, wherein the information includes information for at least one of a resource pool index and/or initial allocation timing of the resource pool and performing the narrowband sidelink communication through at least one resource pool determined based on the information and a specific hopping pattern on a frequency domain, wherein the specific hopping pattern may be determined based on a hopping pattern configured for another narrowband-based communication of the terminal.

Furthermore, in the method according to an embodiment of the disclosure, the another narrowband-based communication may be at least one of machine type communication (MTC) and/or narrowband-Internet of Things (NB-IoT) communication supporting a plurality of repetition transmissions.

Furthermore, in the method according to an embodiment of the disclosure, the specific hopping pattern may be determined based on a hopping pattern configured for the MTC, and the at least one resource pool may be configured based on the transmission unit of the MTC.

Furthermore, in the method according to an embodiment of the disclosure, the at least one resource pool may be configured in a 6-resource block unit.

Furthermore, in the method according to an embodiment of the disclosure, the resource pool index may be set based on a domain of a virtual resource pool, and a physical index of the virtual resource pool may be determined based on downlink control information for the transmission of the MTC.

Furthermore, the method according to an embodiment of the disclosure may further include transmitting, to the base station, indication information for the determination of the specific hopping pattern based on the hopping pattern configured for the MTC when the transmission based on the MTC may be terminated.

Furthermore, in the method according to an embodiment of the disclosure, the indication information may be transmitted in a first subframe located after timing at which the transmission based on the MTC is terminated.

In a terminal performing sidelink communication in a wireless communication system according to an embodiment of the disclosure, the terminal includes a transceiver for transmitting or receiving a radio signal and a processor functionally connected to the transceiver. The processor is configured to receive, from a base station, information for a resource pool related to narrowband sidelink communication, wherein the information includes information for at least one of a resource pool index and/or initial allocation timing of the resource pool and to perform the narrowband sidelink communication through at least one resource pool determined based on the information and a specific hopping pattern on a frequency domain. The specific hopping pattern may be determined based on a hopping pattern configured for another narrowband-based communication of the terminal.

Furthermore, in the terminal according to an embodiment of the disclosure, the another narrowband-based communication may be at least one of machine type communication (MTC) and/or narrowband-Internet of Things (NB-IoT) communication supporting a plurality of repetition transmissions.

Furthermore, in the terminal according to an embodiment of the disclosure, the specific hopping pattern may be determined based on a hopping pattern configured for the MTC, and the at least one resource pool may be configured based on the transmission unit of the MTC.

Furthermore, in the terminal according to an embodiment of the disclosure, the at least one resource pool may be configured in a 6-resource block unit.

Furthermore, in the terminal according to an embodiment of the disclosure, the resource pool index may be set based on a domain of a virtual resource pool, and a physical index of the virtual resource pool may be determined based on downlink control information for the transmission of the MTC.

Furthermore, in the terminal according to an embodiment of the disclosure, the processor may be configured to transmit, to the base station, indication information for the determination of the specific hopping pattern based on the hopping pattern configured for the MTC when the transmission based on the MTC may be terminated.

Furthermore, in the terminal according to an embodiment of the disclosure, the indication information may be transmitted in a first subframe located after timing at which the transmission based on the MTC is terminated.

Furthermore, in a base station setting up sidelink communication in a wireless communication system according to an embodiment of the disclosure, the base station includes a transceiver for transmitting or receiving a radio signal and a processor functionally connected to the transceiver. The processor may be configured to transmit, to a terminal, information for a resource pool related to narrowband sidelink communication. The information may include information for at least one of a resource pool index and/or initial allocation timing of the resource pool. The narrowband sidelink communication may be performed by the terminal through at least one resource pool determined based on the information and a specific hopping pattern on a frequency domain. The specific hopping pattern may be determined based on a hopping pattern configured for another narrowband-based communication of the terminal.

Advantageous Effects

According to an embodiment of the disclosure, there is an effect in that a collision between a resource for narrowband sidelink communication and a resource for another narrowband-based communication (e.g., MTC, NB-IoT) can be minimized.

Furthermore, according to an embodiment of the disclosure, there are effects in that the complexity of an operation of a UE and overhead in terms of signaling can be reduced because a hopping pattern previously configured for a UE is used without any change.

Effects which may be obtained in the disclosure are not limited to the aforementioned effects, and other technical effects not described above may be evidently understood by a person having ordinary skill in the art to which the disclosure pertains from the following description.

DESCRIPTION OF DRAWINGS

The accompany drawings, which are included as part of the detailed description in order to help understanding of the disclosure, provide embodiments of the disclosure and describe the technical characteristics of the disclosure along with the detailed description.

FIG. 1 illustrates the structure of a radio frame in a wireless communication system to which the present disclosure may be applied.

FIG. 2 is a diagram illustrating a resource grid for one downlink slot in a wireless communication system to which the present disclosure may be applied.

FIG. 3 illustrates the structure of a downlink subframe in a wireless communication system to which the present disclosure may be applied.

FIG. 4 illustrates the structure of an uplink subframe in a wireless communication system to which the present disclosure may be applied.

FIG. 5 is a diagram for describing elements for a direct communication (D2D) scheme between UEs.

FIG. 6 is a diagram illustrating an embodiment of the configuration of a resource unit.

FIG. 7 illustrates a frame format available in an NR system to which the present disclosure may be applied.

FIG. 8 illustrates detailed examples of a frame format available in an NR system to which the present disclosure may be applied.

FIG. 9 illustrates examples of resource pool configurations according to a system bandwidth of a wireless communication system to which a method proposed in the present disclosure may be applied.

FIG. 10 illustrates an example of a method of allocating a physical downlink shared channel (PDSCH) related to machine type communication (MTC) transmission.

FIG. 11 illustrates an example of a method of configuring a resource pool for further enhanced device-to-device (FeD2D)-based communication to which a method proposed in the present disclosure may be applied.

FIG. 12 illustrates an example of a resource pool configuration for FeD2D-based communication to which a method proposed in the present disclosure may be applied.

FIG. 13 illustrates an example of a resource pool configuration for FeD2D-based communication and MTC resource allocation to which a method proposed in the present disclosure may be applied.

FIG. 14 illustrates an operating flowchart of a UE that performs sidelink communication in a wireless communication system to which a method proposed in the present disclosure may be applied.

FIG. 15 illustrates signaling between a UE and base station that perform sidelink communication in a wireless communication system to which a method proposed in the present disclosure may be applied.

FIG. 16 illustrates a block diagram of a wireless communication apparatus to which methods proposed in the present disclosure may be applied.

FIG. 17 illustrates a block diagram of a communication apparatus according to an embodiment of the present disclosure.

MODE FOR INVENTION

Hereinafter, preferred embodiments of the present disclosure will be described in detail with reference to the accompanying drawings. A detailed description to be disclosed below together with the accompanying drawing is to describe embodiments of the present disclosure and not to describe a unique embodiment for carrying out the present disclosure. The detailed description below includes details in order to provide a complete understanding. However, those skilled in the art know that the present disclosure can be carried out without the details.

In some cases, in order to prevent a concept of the present disclosure from being ambiguous, known structures and devices may be omitted or may be illustrated in a block diagram format based on core function of each structure and device.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS) or an access point (AP). Further, a "terminal" may be fixed or movable and be substituted with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device or a device-to-device (D2D) device.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present disclosure and the use of the specific terms may be modified into other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11(Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present disclosure may be supported by the standard documents disclosed in at least one of IEEE 802, 3GPP, and 3GPP2, that is, wireless access systems. That is, steps or parts not described to definitely show the technical spirit of the present disclosure among the embodiments of the present disclosure may be based on the documents. Further, all terms disclosed in the document may be described by the standard document.

3GPP LTE/LTE-A is primarily described for clear description, but technical features of the present disclosure are not limited thereto.

General System

FIG. 1 illustrates a structure a radio frame in a wireless communication system to which the present disclosure can be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous sub-carriers in one slot.

FIG. 1(b) illustrates the type 2 radio frame structure. The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule showing how uplink and downlink are allocated (or reserved) with respect to all of subframes. Table 1 represents the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 represents a configuration (i.e., the length of a DwPTS/GP/UpPTS) of the special subframe.

FIG. 2 is a diagram illustrating a resource grid for one downlink slot in the wireless communication system to which the present disclosure can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present disclosure is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present disclosure can be applied.

Referring to FIG. 3, a maximum of three former OFDM symbols in the first slot of the subframe is a control region to which control channels are allocated and residual OFDM symbols is a data region to which a physical downlink shared channel (PDSCH) is allocated. Examples of the downlink control channel used in the 3GPP LTE include a physical control format indicator channel (PCFICH), a physical downlink control channel (PDCCH), a physical hybrid-ARQ indicator channel (PHICH), and the like.

The PCFICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport a resource allocation and transmission format (also referred to as a downlink grant) of

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. The format of the PDCCH and the number of bits of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) configured to be specific to a terminal. In other words, as described above, the PDCCH may be transmitted in up to three OFDM symbols in the first slot of a subframe, but the EPDCCH may be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with sidelink shared channel (SL-SCH) and PSCCH Information, and so on. Multiple EPDCCHs may be supported and the terminal may monitor the set of EPCCHs.

The EPDCCH may be transmitted using one or more successive advanced CCEs (ECCEs), and the number of ECCEs per EPDCCH may be determined for each EPDCCH format.

Each ECCE may be composed of a plurality of enhanced resource element groups (EREGs). An EREG is used to define the mapping of ECCE to RE. There are 16 EREGs per PRB pair. All REs are numbered from 0 to 15 in the order in which the frequency increases, except for the RE that carries the DMRS in each PRB pair.

The UE may monitor a plurality of EPDCCHs. For example, one or two EPDCCH sets may be configured in one PRB pair in which the terminal monitors the EPDCCH transmission.

Different coding rates may be realized for the EPOCH by merging different numbers of ECCEs. The EPOCH may use localized transmission or distributed transmission, which may result in different mapping of the ECCE to the REs in the PRB.

FIG. 4 illustrates a structure of an uplink subframe in the wireless communication system to which the present disclosure can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH is frequency-hopped in a slot boundary.

Device-to-Device (D2D) Communication

FIG. 5 is a diagram for describing elements of a D2D (device-to-device) communication technique.

In FIG. 5, a UE means a terminal of a user, but when network equipment such as an eNB transmits and receives a signal according to a communication method with the UE, the corresponding network equipment may also be regarded as a kind of UE. Hereinafter, UE1 may operate to select a resource unit corresponding to a specific resource in a resource pool representing a set of resources and transmit a D2D signal using the corresponding resource unit. UE2, which is a receiving UE, configures a resource pool through which UE1 can transmit a signal, and detects a signal of UE1 within the corresponding pool. Here, the resource pool may be informed by the base station when UE1 is in the connection range of the base station, and may be determined by another UE or determined as a predetermined resource when it is outside the connection range of the base station. In general, a resource pool may include a plurality of resource units, and each UE may select one or a plurality of resource units to use for transmitting their D2D signals.

FIG. 6 is a diagram illustrating an embodiment of a configuration of a resource unit.

Referring to FIG. 6, a total frequency resource is divided into N_F and a total time resource is divided into N_T, so that the total number of N_F*N_T resource units may be defined. In this case, it can be expressed that the resource pool is repeated every N_T subframes. Specifically, one resource unit may be expressed periodically and repeatedly as shown in the figure. Alternatively, in order to obtain a diversity effect in a time or frequency dimension, an index of a physical resource unit to which one logical resource unit is mapped may change in a predetermined pattern according to time. In this resource unit structure, a resource pool may mean a set of resource units that can be used for transmission by a UE that intends to transmit a D2D signal.

The resource pool described above may be subdivided into several types. First, resource pools may be classified according to contents of D2D signals transmitted from each resource pool. As an example, the contents of the D2D signal may be classified as follows, and a separate resource pool may be configured, respectively.

Scheduling assignment (SA): A signal containing information such as a location of a resource for a transmission of a D2D data channel performed by each transmitting UE, a modulation and coding scheme (MCS), or MIMO transmission method, and/or timing advance required for demodulation of other data channels. This signal may be multiplexed and transmitted together with D2D data on the same resource unit, and the SA resource pool in the present disclosure may mean a pool of resources transmitted by multiplexing the SA with D2D data, and another name may be called a D2D control channel.

D2D data channel: A resource pool used by a transmitting UE to transmit user data using resources specified through SA. When it is possible to transmit multiplexed data with D2D data on the same resource unit, the resource pool for the D2D data channel may be a form in which only the D2D data channel having the form except for the SA information is transmitted. In other words, the resource elements used to transmit SA information on individual resource units in the SA resource pool may still be used to transmit D2D data in the D2D data channel resource pool.

Discovery channel: The resource pool for a message that allows a transmitting UE to transmit information, such as its ID, so that a neighboring UE can discover the transmitting UE itself.

Contrary to the above case, even when the content of the D2D signal is the same as each other, different resource pools may be used according to the transmission/reception attributes of the D2D signal. As an example, even in the same D2D data channel or discovery message, based on a transmission timing determination method of a D2D signal (for example, whether it is transmitted at the time of receiving a synchronization reference signal or is transmitted by applying a constant timing advance from the time) or a resource allocation method (for example, whether the eNB assigns transmission resources of an individual signal to an individual transmitting UE or whether an individual transmitting UE selects an individual signaling resource on its own within a pool), a signal format (for example, the number of symbol of each D2D signal occupies in one subframe, or the number of subframes used to transmit one D2D signal), signal strength from eNB, and transmit power strength of the D2D UE, it may be again divided into different resource pools.

In the present disclosure, for convenience of explanation, in D2D or V2V communication, a method in which eNB directly indicates transmission resources of D2D transmitting UE is called/defined as Mode 1 or Mode 3 and a method in which the transmission resource region is set in advance or the eNB assigns the transmission resource region and the UE directly selects the transmission resource is called/defined as ode 2 or Mode 4. In case of D2D discovery, a case where the eNB directly indicates a resource is called/defined as Type 2 and a case where a UE directly selects a transmission resource in a predetermined resource region or a resource region indicated by the eNB is called/defined as Type 1.

The above-mentioned D2D may be called sidelink, and SA may be called as a physical sidelink control channel (PSCCH), a D2D synchronization signal may be called as a sidelink synchronization signal (SSS), and a control channel that transmits the most basic information before D2D communication and transmitted with SSS may be called a physical sidelink broadcast channel (PSBCH), or another name, a physical D2D synchronization channel (PD2DSCH). A signal for notifying that a specific terminal is in the vicinity thereof, in which case the signal may include an ID of the specific terminal, and this channel may be called a physical sidelink discovery channel (PSDCH).

In Rel. 12 D2D, only a D2D communication UE transmits a PSBCH together with an SSS. Accordingly, the measurement of the SSS is performed using the DMRS of the PSBCH. An out-coverage UE measures the DMRS of the PSBCH, and determines whether it will become a synchronization source by measuring reference signal reference signal received power (RSRP) of the DMRS.

NR System and Related Frame Format

In next-generation communication such as 5G and New Rat (NR), there emerges a need for enhanced mobile broadband communication compared to the existing radio access technology (RAT) because more communication devices require a greater communication capacity.

Furthermore, massive machine type communications (MTC) that provide various services anywhere and at any time by connecting multiple device and things is also one of major issues to be considered in the next-generation communication.

Furthermore, the design or structure of a communication system in which services and/or UEs sensitive to reliability and latency have been considered is being discussed.

As described above, the introduction of the next-generation radio access technology (RAT) in which enhanced mobile broadband (eMBB) communication, massive MTC (mMTC), ultra-reliable and low latency communication (URLLC) have been considered is being discussed. In the present disclosure, the corresponding technology is commonly referred to as a "New RAT(NR)", for convenience sake.

The frame format of an NR system has a form of a self-contained structure in which all of a DL control channel, a DL data channel or an UL data channel, and an UL control channel may be included in one frame unit as in FIG. 7. In this case, the self-contained structure may be referred to as a self-contained slot structure or a self-contained subframe structure.

FIG. 7 illustrates a frame format available in an NR system to which the present disclosure may be applied.

In this case, DL data scheduling information, UL data scheduling information, etc. may be transmitted in the DL control channel. Furthermore, ACK/NACK information for DL data, CSI information (e.g., modulation and coding scheme (MCS) information, MIMO transmission-related information), a scheduling request, etc. may be transmitted in the UL control channel.

In FIG. 7, a time gap for DL-to-UL switching or UL-to-DL switching may be present between a control region and a data region. Furthermore, some of a DL control region, a DL data region, an UL data region and/or an UL control region may not be configured within one frame. Alternatively, the sequence of regions (or channels) configuring one frame may be different.

FIG. 8 illustrates detailed examples of a frame format available in an NR system to which the present disclosure may be applied. FIG. 8 is merely for convenience of description, and the scope of the disclosure is not limited thereto.

Referring to FIG. 8, a frame format which may be considered in the NR system may include four types (i.e., Type A, Type B, Type C, and Type D).

Specifically, the Type A structure may be configured with a DL control region and a DL data region. The Type B structure may be configured with an UL data region and an UL control region. In this case, the UL control region may be omitted depending on a dynamic method.

Furthermore, particularly, as a self-contained structure, the Type C structure may be configured with a DL control region, a DL data region, a guard period (GP) and an UL control region. The Type D structure may be configured with a DL control region, a guard period, an UL data region and an UL control region. In this case, the locations of the UL data region and the UL control region may be changed. The UL control region may be omitted depending on a dynamic method.

Analog Beamforming

In a millimeter wave (mmW), a plurality of antenna elements may be installed in the same area because a wavelength is short.

That is, a wavelength is 1 cm in a 30 GHz band. Accordingly, a total of 64 (8×8) antenna elements may be installed in a 4×4 cm panel in a two-dimensional array form at intervals of 0.5 lambda (wavelength).

Therefore, in the mmW, coverage is increased or throughput is improved by increasing a beamforming (BF) gain using a plurality of antenna element.

In this case, if a transceiver unit (TXRU) is provided in each antenna element to enable transmit power and phase control, independent beamforming is made possible for each frequency resource.

However, there is a problem in that effectiveness is low in the price aspect if the TXRUs are installed in all of 100 antenna elements.

Therefore, a method of mapping a plurality of antenna elements to one TXRU and controlling the direction of a beam using an analog phase shifter is considered.

Such an analog beamforming method has a disadvantage in that frequency selective beamforming cannot be performed because only one beam direction can be formed in a full band.

For such a reason, hybrid BF (HBF) having B TXRUs, that is, a number smaller than Q antenna elements, as a middle form of digital BF and analog BF may be considered.

The HBF is different depending on a method of connecting the B TXRUs and the Q antenna elements, but the direction of beams that may be transmitted at the same time is limited to B or less.

The aforementioned D2D communication may also be applied to a narrowband. For example, D2D communication for performing narrowband transmission may be referred to as further enhanced D2D communication (FeD2D communication). FeD2D communication described in the present disclosure may mean narrowband sidelink communication.

In this case, when a resource pool for FeD2D communication for performing narrowband transmission is configured, it is necessary to consider co-existence with the existing narrowband system (e.g., machine type communication (MTC) or narrowband-Internet of Things (NB-IoT) communication). In this case, in order to minimize the influence of FeD2D transmission on MTC and/or NB-IoT communication or minimize a collision with MTC and/or NB-IoT transmission, it may be preferred tat a resource for the transmission of FeD2D is configured identically with a resource for the transmission of MTC and/or NB-IoT.

For example, in the case of MTC, a plurality of repetition transmissions may be performed for coverage enhancement. In this case, in order to minimize interference between UEs, hopping (e.g., frequency hopping) may be applied between the repetition transmissions.

In this case, in order for the FeD2D transmission of a specific UE to not affect the MTC transmission of other UEs, it may be preferred that an F2D2D signal is transmitted on the same resource as that of the MTC transmission pattern (e.g., the hopping pattern, frequency the hopping pattern) of the corresponding UE. For example, resource pools for FeD2D may be configured in a form in which the resource pools have been divided in a specific number of resource block (e.g., 6 RBs) units on a frequency domain based on an MTC transmission unit. In this case, the 6 resource blocks may be contiguously disposed so that they are transmitted in the same method as MTC transmission. A resource pool and/or MTC transmission unit for FeD2D may be configured like FIG. 9.

FIG. 9 illustrates examples of resource pool configurations according to a system bandwidth of a wireless communication system to which a method proposed in the present disclosure may be applied. FIG. 9 is merely for convenience of description, and does not limit the scope of the present disclosure.

FIG. 9(a) illustrates a resource pool configuration when system bandwidths are 1.4 MHz, 3 MHz, and 5 MHz. FIG. 9(b) illustrates a resource pool configuration when system bandwidths are 10 MHz, 15 MHz, and 20 MHz.

Referring to FIG. 9(b), in the case of MTC, in a system bandwidth of a 10 MHz band (i.e., 50 RBs), the remaining 48 RBs (i.e., 48 PRBs) except Nos. 0 and 49 (i.e., both ends) RBs may be configured with (or mapped to) 8 narrowbands. In this case, each narrowband may be configured with 6 contiguous PRBs. Furthermore, in the case of FeD2D, likewise, resource pools in which the remaining 48 RBs except Nos. 0 and 49 RBs are configured with 8 narrowbands may be configured.

In the present disclosure, for convenience of description, the configuration of a hopping pattern of MTC and an FeD2D resource pool using narrowbands configured with 6 RBs is described. However, such a method may be extended and applied to other systems (i.e., another narrowband-based communication) using narrowbands identically or similarly. For example, other system using narrowbands may mean an NB-IoT system using 1 RB or a system supporting resource granularity (e.g., subcarrier unit) of 1 RB or less.

As described above, the resource pool of a UE that performs FeD2D-based communication may be configured by considering a specific hopping pattern. For example, a resource pool for FeD2D communication may be configured to follow an MTC hopping pattern configured in a corresponding UE. That is, a resource pool related to narrowband sidelink communication may be determined based on an MTC hopping pattern.

In this case, as in a method of allocating a physical downlink shared channel (PDSCH), a resource pool is not fixed to a predetermined location in the frequency domain, but may be configured to use a different frequency domain every transmission timing.

FIG. 10 illustrates an example of a method of allocating a PDSCH related to MTC transmission. FIG. 10 is merely for convenience of description, and does not restrict the scope of the disclosure.

Referring to FIG. 10, an MTC PDCCH (MPDCCH) may be repeated, frequency-hopped and transmitted. The resource of a resource may be allocated by the MPDCCH. In this case, a PDSCH may be repeated and transmitted while changing its location on the frequency domain based on a frequency hopping pattern configured in a corresponding UE.

As described above, similar to a resource allocation method of a PDSCH, such as that illustrated in FIG. 10, a resource pool for FeD2D may be configured. For example, when a UE that performs FeD2D-based communication performs k repetition transmissions (in contiguous subframes), a resource (i.e., PRB resource) for the k transmissions may be configured through the application of a resource and MTC hopping pattern for the first PDSCH (or PUSCH) transmission determined from DCI (i.e., MPDCCH) for MTC transmission. Specifically, the resource for the first PDSCH or PUSCH transmission may be represented as a narrowband index. The resource for k transmissions may be configured or determined in a form in which the FeD2D resource pool is hopped.

That is, a base station cannot indicate the location or PRB resource (or the index of the PRB resource) of an FeD2D resource pool as a specific value with respect to a UE (i.e., FeD2D UE), and the value thereof may be changed based on the transmission timing of FeD2D data.

In this case, a value(s) that is not changed ora value(s) to which reference can be made may be timing (e.g., subframe) at which a PDSCH (or PUSCH) is scheduled from an MPDCCH, frequency resource allocation (e.g., RB allocation) or an allocated narrowband index at corresponding timing. For example, in relation to the timing, in FIG. 10, if an MPDCCH is allocated up to an n-th subframe, a PDSCH or PUSCH may be scheduled from an (n+k0)-th subframe.

Accordingly, a base station may configure a resource pool for performing FeD2D-based communication in the domain form of a virtual RB based on a corresponding value and/or timing with respect to a UE (i.e., FeD2D UE).

In this case, an actual physical RB index or actual PRB allocation of the corresponding virtual RB may be determined from a value derived by DCI (e.g., MPDCCH) for MTC transmission and/or a value hopped up to actual FeD2D transmission timing as in FIG. 11. That is, a resource pool index for narrowband sidelink communication may be set based on the domain of a virtual resource pool. The physical index of a virtual resource pool may be determined based on DCI for the transmission of MTC.

FIG. 11 illustrates an example of a method of configuring a resource pool for FeD2D-based communication to which a method proposed in the present disclosure may be applied. FIG. 11 is merely for convenience of description, and does not limit the scope of the present disclosure.

Referring to FIG. 11, an MTC PDCCH (MPDCCH) may be repeated and frequency-hopped and may be transmitted up to an n-th subframe. A specific resource pool for FeD2D-based communication may be allocated by the MPDCCH. In this case, the first resource pool is allocated to an (n+k0)-th subframe. A subsequent resource pool(s) may be determined while changing its location on the frequency domain based on a specific hopping pattern (e.g., an MTC frequency hopping pattern configured in a corresponding UE. In this case, the resource pool may be indexed in the form of a virtual resource pool.

In order to use the aforementioned method, a base station may transmit, to a UE (i.e., FeD2D UE), information on a resource pool for FeD2D-based communication through a system information block (SIB) and/or higher layer signaling (e.g., radio resource control (RRC) signaling). That is, the base station may transmit, to the UE, configuration information for the resource pool for narrowband sidelink communication. In this case, the corresponding information may include information for the index of a virtual resource pool (e.g., an index illustrated in FIG. 11) and/or initial allocation timing (e.g., (n+k0)-th subframe) of the corresponding resource pool.

A UE that has received such information may determine the location of a physical resource pool at timing at which a control channel (e.g., a physical sidelink control channel (PDCCH)) and/or a data channel (e.g., a physical sidelink shared channel (PSSCH)) will be transmitted based on a hopping pattern (e.g., configured MTC hopping pattern).

Furthermore, the MTC transmission of a specific UE is not always performed. Although MTC transmission is performed, an MTC transmission period may not be identical with an FeD2D transmission period. When such a point is considered, if MTC transmission is not performed (i.e., although MTC transmission is not present), a resource pool for FeD2D-based communication (i.e., FeD2D transmission) may need to be configured. Accordingly, as in FIG. 12, a resource pool(s) for FeD2D-based communication may be configured assuming that a corresponding hopping pattern (i.e., MTC hopping pattern) is maintained for a given period although MTC transmission is terminated.

FIG. 12 illustrates an example of a resource pool configuration for FeD2D-based communication to which a method proposed in the present disclosure may be applied. FIG. 12 is merely for convenience of description, and does not limit the scope of the present disclosure.

Referring to FIG. 12, a resource pool for FeD2D-based communication may be configured by maintaining a hopping pattern configured for previously terminated MTC transmission. For example, even after MTC transmission during an MTC transmission period (i.e., b) period) illustrated in FIG. 12 is terminated, a resource pool for FeD2D-based communication may be configured assuming that an MTC hopping pattern is maintained during a specific period (i.e., c) period).

In this case, an FeD2D UE that has recognized (i.e., detected) that the MTC transmission has been terminated may transmit, to a base station, information (e.g., indicator) indicating that the (previously terminated) MTC hopping pattern continues to be used. In this case, the corresponding information may be transmitted during the specific period (i.e., c) period) illustrated in FIG. 12. For example, the corresponding information may be configured to be transmitted in a (i.e., the first) subframe (e.g., MTC subframe) right after the MTC transmission period (i.e., b) period) illustrated in FIG. 12 is terminated.

Through such a procedure, the base station may configure a corresponding hopping pattern to be continues even in new MTC transmission with reference to the information transmitted by the UE when the base station allocates a resource for next MTC transmission of the corresponding UE as in FIG. 13.

FIG. 13 illustrates an example of a resource pool configuration for FeD2D-based communication and MTC resource allocation to which a method proposed in the present disclosure may be applied. FIG. 13 is merely for convenience of description, and does not limit the scope of the present disclosure.

Referring to FIG. 13, a case where the resource pool for FeD2D-based communication configuration is configured or determined through the method described in FIG. 12 is assumed.

As described above, a base station may receive, from a UE, information indicating that an MTC hopping pattern, such as that described above, continues to be used. In this case, as illustrated in a specific period (i.e., c) period) of FIG. 13, when allocating a resource for next MTC transmission of the UE, the base station may allocate an MTC resource(s) that does not superpose a resource pool for FeD2D-based communication and that is configured by considering the existing hopping pattern.

However, the base station may neglect the information transmitted by the UE (i.e., information indicating that the corresponding UE continues to use the MTC hopping pattern), and may newly perform resource allocation for MTC transmission. In this case, the resource pool for FeD2D-based communication (i.e., transmission) may also be changed. In this case, the UE (i.e., FeD2D UE) may configure or determine the resource pool for FeD2D-based communication using the aforementioned method with reference to a value of DCI for new MTC transmission.

FIG. 14 illustrates an operating flowchart of a UE that performs sidelink communication in a wireless communication system to which a method proposed in the present disclosure may be applied. FIG. 14 is merely for convenience of description, and does not limit the scope of the present disclosure.

Referring to FIG. 14, a case where a UE performs FeD2D-based communication, that is, narrowband sidelink communication, with another UE is assumed. Furthermore, the corresponding UE and a base station may be configured to operate based on a resource pool configuration method for FeD2D-based communication.

First, the UE may receive, from the base station, information for a resource pool related to narrowband sidelink communication (step S1405). In this case, the corresponding information may be delivered through higher layer signaling (e.g., RRC signaling) or a system information block (SIB). In this case, the corresponding information may include information for at least one of a resource pool index (e.g., an index indicative of the virtual resource pool #3 in FIG. 11) and/or initial allocation timing (e.g., (n+k0)-th subframe in FIG. 11) of the resource pool.

The UE may perform narrowband sidelink communication (with another UE) through at least one resource pool determined based on the received information and a specific hopping pattern (i.e., frequency hopping pattern) on the frequency domain (step S1410). In this case, the specific hopping pattern may be determined based on a hopping pattern (e.g., the MTC hopping pattern in FIG. 10) configured for another narrowband-based communication of the corresponding UE.

For example, another narrowband-based communication of the corresponding UE may be at least one of MTC supporting a plurality of repetition transmissions and/or narrowband NB-IoT communication.

Furthermore, if the specific hopping pattern is determined based on a hopping pattern configured for MTC (i.e., MTC hopping pattern), at least one resource pool used for narrowband sidelink communication may be configured based on a transmission unit (e.g., 6 RBs) of MTC.

Furthermore, as described in FIG. 11 and a related portion, a resource pool index included in information transmitted by the base station may be set based on the domain of a virtual resource pool. That is, the resource pool index may be a virtual resource pool index. In this case, the physical index of the virtual resource pool may be determined based on downlink control information (DCI) (e.g., DCI transmitted through an MPDCCH) for the transmission of MTC.

Furthermore, a case where the MTC transmission of a UE has been performed is assumed. In this case, when the MTC-based transmission is terminated, the UE may transmit, to a base station, indication information determined based on a hopping pattern (i.e., MTC hopping pattern) in which a specific hopping pattern has been configured for MTC. That is, when the UE recognizes that the MTC-based transmission is terminated, the corresponding UE may transmit, to the base station, information indicating that the hopping pattern of MTC whose transmission has been terminated will be maintained without any change. In this case, the corresponding indication information may be configured to be transmitted in the first subframe (or slot) located after timing (e.g., terminated subframe or slot) at which the MTC-based transmission is terminated.

In relation to this, the corresponding UE may be configured as an apparatus, such as that illustrated in FIGS. 16 and 17. When such a point is considered, an operation in FIG. 14 may be performed by the apparatus illustrated in FIGS. 16 and 17.

In other words, a processor 1621 (or processor 1710) may control to receive, from a base station, information for a resource pool related to narrowband sidelink communication (step S1405). Furthermore, the processor 1621 (or the processor 1710) may control to perform narrowband sidelink communication (with another UE) through at least one resource pool determined based on the received information and a specific hopping pattern on the frequency domain (step S1410).

FIG. 15 illustrates signaling between a UE and base station that perform sidelink communication in a wireless communication system to which a method proposed in the present disclosure may be applied. FIG. 15 is merely for convenience of description, and does not limit the scope of the present disclosure.

FIG. 15 represents signaling for operations of a UE and base station in FIG. 14. Detailed contents redundant with the description of FIG. 14 are omitted in the part of FIG. 15.

First, a base station may transmit, to a first UE, information for a resource pool related to narrowband sidelink communication (step S1505). The corresponding step is the same as step S1405 in FIG. 14, and a detailed description thereof is omitted.

Next, the first UE may determine at least one resource pool based on the received information for the resource pool and a specific hopping pattern (step S1510). That is, the first UE may identify (or allocate) a resource pool(s) in which narrowband sidelink communication will be performed along with another UE (i.e., second UE) based on the received information for the resource pool and the specific hopping pattern (e.g., MTC hopping pattern). The corresponding step is the same as part of step S1510 in FIG. 14, and a detailed description thereof is omitted.

Thereafter, the first UE may perform sidelink communication with the second UE using the determined at least one resource pool (step S1515). For example, the first UE may receive, from the base station, allocation based on the received information for the resource pool and the hopping pattern (e.g., MTC hopping pattern) of another narrowband-based communication previously configured in the corresponding UE, and may transmit a PSCCH and/or a PSSCH to the second UE based on the allocation.

In relation to this, the corresponding base station may be configured as an apparatus, such as that illustrated in FIG. 16. When such a point is considered, the operation of the base station in FIG. 15 may be performed by the apparatus illustrated in FIG. 16.

In other words, the processor 1611 may control to transmit, to the UE (e.g., the first UE), the information for the resource pool related to narrowband sidelink communication (step S1505).

If a resource pool for narrowband sidelink communication is configured or set through the aforementioned method, there is an advantage in that a collision between a resource for narrowband sidelink communication and a resource for another narrowband-based communication (e.g., MTC, NB-IoT) can be minimized.

Furthermore, the complexity of an operation of a UE and overhead in terms of signaling can be reduced because a hopping pattern previously configured in the UE can be maintained and used without any change.

General Apparatus to which the Present Disclosure May be Applied

FIG. 16 illustrates a block diagram of a wireless communication apparatus to which methods proposed in the present disclosure may be applied.

Referring to FIG. 16, a wireless communication system includes a base station 1610 and multiple UEs 1620 located within the area of the base station 1610.

The base station 1610 includes a processor 1611, a memory 1612 and a radio frequency (RF) unit 1613. The processor 1611 implements the functions, processes and/or methods proposed in FIGS. 1 to 15. The layers of a radio interface protocol may be implemented by the processor 1611. The memory 1612 is connected to the processor 1611 and stores various types of information for driving the processor 1611. The RF unit 1613 is connected to the processor 1611 and transmits and/or receives a radio signal.

A UE 1620 includes a processor 1621, a memory 1622 and an RF unit 1623.

The processor 1621 implements the functions, processes and/or methods proposed in FIGS. 1 to 15. The layers of a radio interface protocol may be implemented by the processor 1621. The memory 1622 is connected to the processor 1621 and stores various types of information for driving the processor 1621. The RF unit 1623 is connected to the processor 1621 and transmits and/or receives a radio signal.

The memory 1612, 1622 may be positioned inside or outside the processor 1611, 1621 and may be connected to the processor 1611, 1621 by well-known means.

For example, in order to transmit and receive DL data in a wireless communication system supporting a low latency service, the UE may include the radio frequency (RF) unit for transmitting and receiving radio signals and the processor functionally connected to the RF unit.

Furthermore, the base station 1610 and/or the UE 1620 may have a single antenna or multiple antennas.

FIG. 17 illustrates a block diagram of a communication apparatus according to an embodiment of the present disclosure.

Particularly, FIG. 17 is a diagram illustrating the UE of FIG. 16 more specifically.

Referring to FIG. 17, the UE may include a processor (or digital signal processor (DSP)) 1710, an RF module (or RF unit) 1735, a power management module 1705, an antenna 1740, a battery 1755, a display 1715, a keypad 1720, a memory 1730, a subscriber identification module (SIM) card 1725 (this element is optional), a speaker 1745, and a microphone 1750. Furthermore, the UE may include a single antenna or multiple antennas.

The processor 1710 implements the function, process and/or method proposed in FIGS. 1 to 15. The layers of a radio interface protocol may be implemented by the processor 1710.

The memory 1730 is connected to the processor 1710, and stores information related to an operation of the processor 1710. The memory 1730 may be positioned inside or outside the processor 1710 and may be connected to the processor 1710 by various well-known means.

A user inputs command information, such as a telephone number, by pressing (or touching) a button of the keypad 1720 or through voice activation using the microphone 1750, for example. The processor 1710 receives such command information and performs processing so that a proper function, such as making a phone call to the telephone number, is performed. Operational data may be extracted from the SIM card 1725 or the memory 1730. Furthermore, the processor 1710 may display command information or driving information on the display 1715 for user recognition or convenience.

The RF module 1735 is connected to the processor 1710 and transmits and/or receives RF signals. The processor 1710 delivers command information to the RF module 1735 so that the RF module 1735 transmits a radio signal that forms voice communication data, for example, in order to initiate communication. The RF module 1735 includes a receiver and a transmitter in order to receive and transmit radio signals. The antenna 1740 functions to transmit and receive radio signals. When a radio signal is received, the RF module 1735 delivers the radio signal so that it is processed by the processor 1710, and may convert the signal into a baseband. The processed signal may be converted into audible or readable information output through the speaker 1745.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

Although the method of performing sidelink communication in a wireless communication system according to the present disclosure has been described as being chiefly applied to the 3GPP LTE/LTE-A/NR system, the method may be applied to various wireless communication systems in addition to the 3GPP LTE/LTE-A/NR system.

The invention claimed is:

1. A method of performing, by a terminal, sidelink communication in a wireless communication system, the method comprising:
receiving, from a base station, information for a resource pool related to narrowband sidelink communication, wherein the information includes information for at least one of a resource pool index and/or initial allocation timing of the resource pool;
performing the narrowband sidelink communication through at least one resource pool determined based on the information and a specific hopping pattern on a frequency domain,
wherein the specific hopping pattern is determined based on a hopping pattern configured for machine type communication (MTC),
wherein the at least one resource pool is configured based on a transmission unit of the MTC; and
based on a transmission related to the MTC being terminated: transmitting, to the base station, indication information for the specific hopping pattern determined based on the hopping pattern configured for the MTC.

2. The method of claim 1,
wherein the MTC supports a plurality of repetition transmissions.

3. The method of claim 1,
wherein the at least one resource pool is configured in a 6-resource block unit.

4. The method of claim 1,
wherein the resource pool index is set based on a domain of a virtual resource pool, and
wherein a physical index of the virtual resource pool is determined based on downlink control information for the transmission of the MTC.

5. The method of claim 1,
wherein the indication information is transmitted in a first subframe located after timing at which the transmission related to the MTC is terminated.

6. A terminal configured to perform sidelink communication in a wireless communication system, the terminal comprising:
a transceiver for transmitting or receiving a radio signal; and
at least one processor functionally connected to the transceiver,
wherein the at least one processor is configured to control to:
receive, from a base station, information for a resource pool related to narrowband sidelink communication, wherein the information includes information for at least one of a resource pool index and/or initial allocation timing of the resource pool,
perform the narrowband sidelink communication through at least one resource pool determined based on the information and a specific hopping pattern on a frequency domain,
wherein the specific hopping pattern is determined based on a hopping pattern configured for machine type communication (MTC),
wherein the at least one resource pool is configured based on a transmission unit of the MTC, and
based on a transmission related to the MTC being terminated: transmitting, to the base station, indication information for the specific hopping pattern determined based on the hopping pattern configured for the MTC.

7. The terminal of claim 6,
wherein the MTC supports a plurality of repetition transmissions.

8. The terminal of claim 6,
wherein the at least one resource pool is configured in a 6-resource block unit.

9. The terminal of claim 6,
wherein the resource pool index is set based on a domain of a virtual resource pool, and
wherein a physical index of the virtual resource pool is determined based on downlink control information for the transmission of the MTC.

10. The terminal of claim 6,
wherein the indication information is transmitted in a first subframe located after timing at which the transmission related to on the MTC is terminated.

11. A base station configured to establish sidelink communication in a wireless communication system, the base station comprising:
a transceiver for transmitting or receiving a radio signal; and
at least one processor functionally connected to the transceiver,
wherein the at least one processor is configured to control to:
transmit, to a terminal, information for a resource pool related to narrowband sidelink communication,
wherein the information includes information for at least one of a resource pool index and/or initial allocation timing of the resource pool,
wherein the narrowband sidelink communication is performed by the terminal through at least one resource pool determined based on the information and a specific hopping pattern on a frequency domain,
wherein the specific hopping pattern is determined based on a hopping pattern configured for machine type communication (MTC),
wherein the at least one resource pool is configured based on a transmission unit of the MTC, and
based on a transmission related to the MTC being terminated: receive, from the terminal, indication information for the specific hopping pattern determined based on the hopping pattern configured for the MTC.

* * * * *